United States Patent [19]

Kim

[11] Patent Number: 5,178,183
[45] Date of Patent: Jan. 12, 1993

[54] COMPRESSOR DISCHARGE VALVE
[75] Inventor: Ju H. Kim, Suwon, Rep. of Korea
[73] Assignee: Samsung Electronics Co., Ltd., Suwon, Rep. of Korea
[21] Appl. No.: 876,090
[22] Filed: Apr. 30, 1992
[30] Foreign Application Priority Data
  May 6, 1991 [KR] Rep. of Korea .................... 6434[U]
[51] Int. Cl.[5] .............................................. F16K 15/03
[52] U.S. Cl. ................... 137/527; 137/857; 417/569
[58] Field of Search ............ 137/856, 857, 527; 417/569

[56] References Cited
U.S. PATENT DOCUMENTS
4,352,377 10/1982 Fritchman ........................ 137/851
4,723,896 2/1988 Fritchman ..................... 137/856 X Primary Examiner—Robert G. Nilson
Attorney, Agent, or Firm—Cushman, Darby & Cushman

[57] ABSTRACT

A discharge valve for a compressor includes a valve plate having a recessed portion formed around a discharge port with a valve seat. A channel having a raised bottom surface is formed at the recessed portion. A valve reed is positioned at the recessed portion, having a circular portion for engaging with the valve seat and a base portion supported on the raised bottom surface of the channel. A valve spring is resiliently mounted over the valve reed to hold the valve reed. The valve spring has an inwardly bent section for press-contacting with the valve reed and an outwardly bowed section with a bent tip, which is resiliently deformable for adapting to the opening movement of the valve reed.

1 Claim, 3 Drawing Sheets

COMPRESSOR DISCHARGE VALVE

FIELD OF THE INVENTION

This invention relates to a discharge valve of a compressor.

DESCRIPTION OF THE PRIOR ART

A hermetic refrigeration compressor universally uses a reed-type discharge valve. One such compressor discharge valve is disclosed in the patent of Jack F. Fritchman, U.S. Pat. No. 4,352,377 as shown in FIG. 1.

In FIG. 1, a cylinder block 1 has a cylinder bore 2 within which a piston 3 is mounted for reciprocating movement. A discharge valve incorporated in a cylinder head 5 includes a valve plate 4 provided between the cylinder block 1 and the cylinder head 5, a discharge port 8 provided on the valve plate 4, a pair of guide posts 9 mounted at the valve plate 4, a valve reed 10 for covering the discharge port 8, a valve spring 11 for resiliently pressing the valve reed 10 against the valve plate 4, a valve stop 12 for holding the valve spring 11 in place and a retainer 13 positioned over the valve stop 12, the valve reed 10, valve spring 11, valve stop 12 and retainer 13 being juxtaposedly mounted on the guide posts 9.

However, such conventional discharge valve including a number of elements becomes rather complex and makes a noise during working.

SUMMARY OF THE INVENTION

It is an object of the present invention to provide a compressor discharge valve having a simplified structure for easy manufacturing.

It is another object of the present invention to provide a compressor discharge valve operable in a minized noise.

The discharge valve for a compressor of the present invention comprises a valve plate having a recessed portion which includes a discharge port with a valve seat lowered than the top surface of the valve plate, the recessed portion being provided with a channel having a raised bottom surface coplanar with the valve seat, a valve reed mounted on the recessed portion and having a base portion to be positioned on the raised bottom surface of the channel and a circular portion extending from the base portion for engaging with the valve seat, a valve spring mounted over the valve reed, the valve spring having an inwardly bent section press-contacting with the valve reed and an outwardly bowed section resiliently deformable for adapting to the opening movement of the valve reed. A trap having a shoulder capturing the opposite end of the valve spring is provided at each side end of the recessed portion of the valve plate for to retain the valve spring.

DETAILED DESCRIPTION OF THE PREFERRED EMBODIMENT

Figure 1:
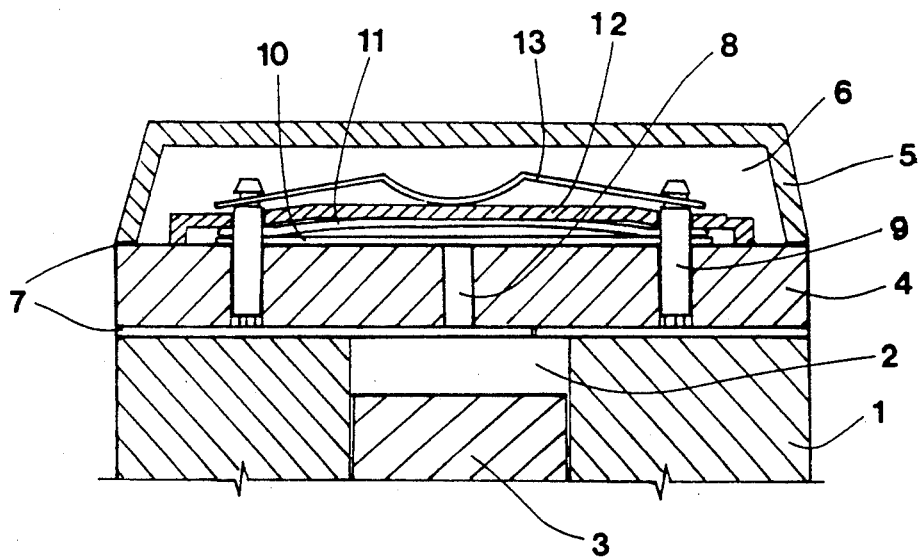
FIG. 1 is a sectional view of a prior art compressor check valve.
Figure 2:
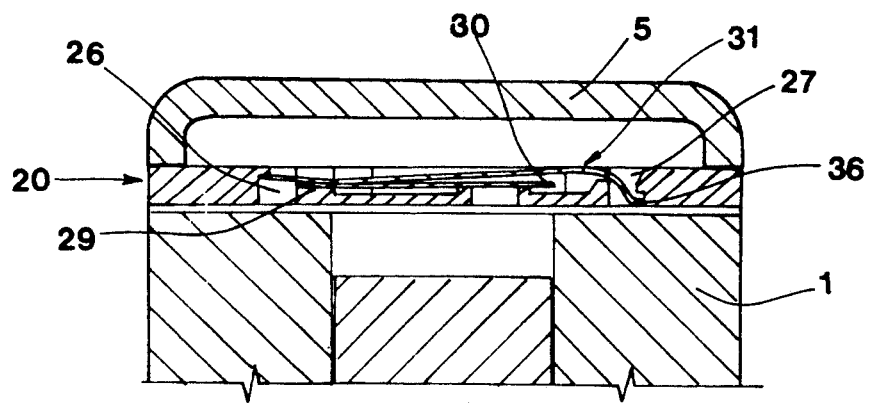
FIG. 2 is a vertical sectional view of the compressor discharge valve of the present invention.
Figure 3:
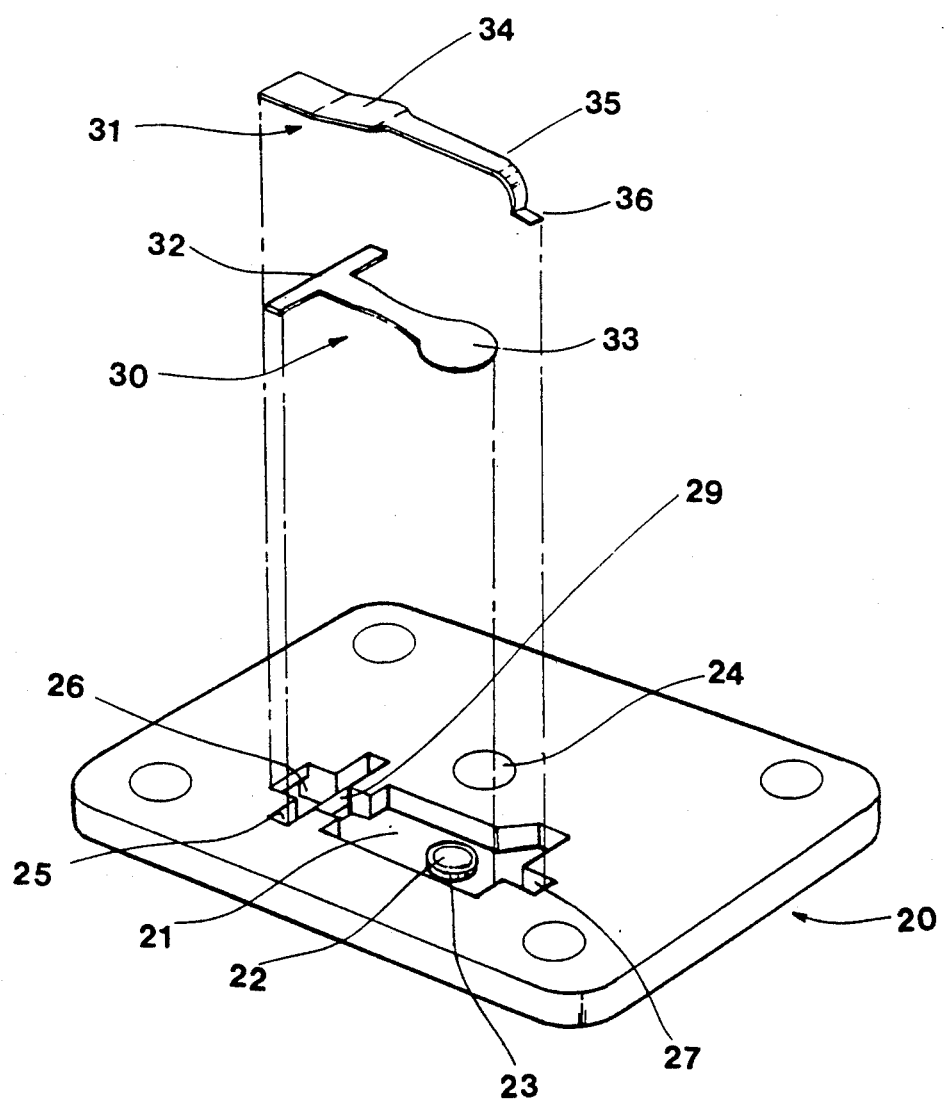
FIG. 3 is an exploded view of the compressor discharge valve of the invention removing a cylinder head.

In the embodied compressor discharge valve of the present invention shown in FIGS. 2 and 3, the structure comprising a cylinder block 1, a piston 3 and a cylinder head 5 is the same with the conventional discharge valve for a compressor. The above elements form no part of the present invention and are designated with the same reference numerals as in FIG. 1.

As shown in FIG. 3, a valve plate 20 mounted on the cylinder block 1 has a recessed portion 21 for mounting a discharge reed valve arrangement, which is formed around a discharge port 22. The discharge port 22 is provided with a valve seat 23 lowered than the top surface of the valve plate 20. A suction port 24 is conventionally provided on the valve plate 20. The recessed protion 21 has a channel 25 of which the bottom surface 29 is raised from the bottom surface of the recessed portion 21 and has the same level as the valve seat 23 of the discharge port 22. Traps 26 and 27 each having a shoulder 28 are provided at side ends of the recessed protion 21.

The reed valve arrangement includes a valve reed 30 and a valve spring 31 which is mounted over the valve reed 30. The valve reed 30 has a base portion 32 and a circular portion 33 extending therefrom. The base portion 32 is positioned in the channel 25. The circular portion 33 engages with the valve seat 23 to close the discharge port 22. The valve spring 31 of resilient materials has an inwardly bent section 34 for press-contacting with the valve reed 30 at the position corresponding to the inner edge of the raised bottom surface 29 of the channel 25 and an outwardly bowed section 35 with a bent tip 36. The bowed section 35 of the valve spring 31 is resiliently deformable to be outwardly bent for adapting to the opeining movement of the valve reed 30. The mounting of the valve spring 31 over the valve reed 30 may be made by bending the valve spring 31 and fitting its ends into the traps 26 and 27. The shoulder provided at upper portion of each of the traps 26 and 27 prevents each end of the valve spring 31 from escaping from the corresponding trap and limits its movement so that the valve spring 31 may be held in place.

Figure 4:
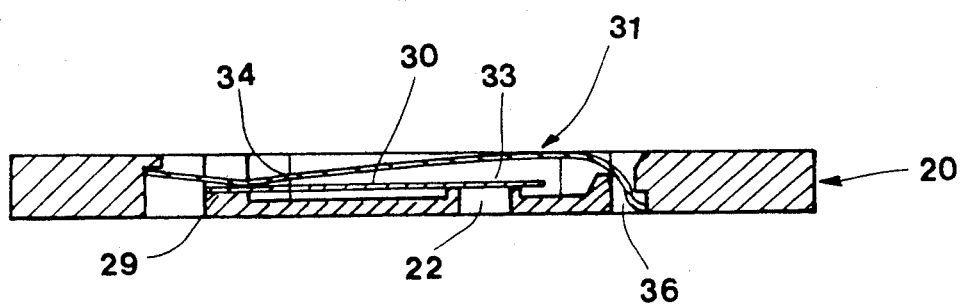
FIGS. 4 and 5 are vertical sectional views illustrating the compressor discharge valve of the invention in the closed and open positions.

FIG. 4 shows the discharge valve under suction stroke of the compressor. The valve reed 30 is maintained to sealingly contact with the valve seat 23 under the pressing force exerted by the inwardly bent section 34 of the valve spring 31 to close the discharge port 22. At this time, a coolant gas flows into the cylinder bore 2 through the suction port 24 shown in FIG. 3.

Figure 5:
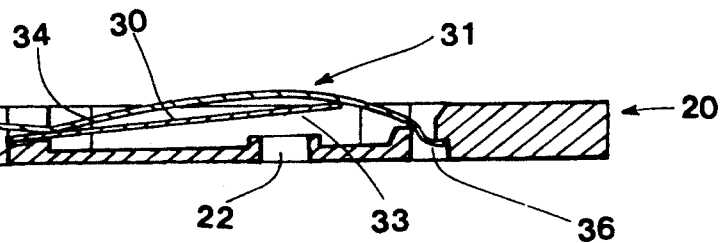

FIG. 5 shows the discharge valve under discharge stroke of the compressor. The coolant gas compressed by the piston 3 in the cylinder bore 2 is discharged through the discharge valve according to the present invention. The circular protion 33 of the valve reed 30 is urged upwardly from the valve seat 23 by the discharging pressure of the compressed coolant against the pressing force of the inwardly bent section 34 of the valve spring 31 to open the discharge port 22. The urged circular portion 33 of the valve reed 30 contacts with a bottom surface of the bowed outwardly portion 35 of the valve spring 31 to be bent upwardly, thereby allowing the valve reed to fully open the discharge port 22. However, the base protion 32 of the valve reed 30 remains contacted with the bottom surface 29 of the channel 25 under the pressing force of the inwardly bent section 34. The bent tip 36 of the valve spring 31 slids along a wall of the trap 27 and stops at its shoulder. When the compression stroke is reversed to the suction stroke, the lifted circular portion 33 of the valve reed 30 resiliently comes back to the position engaging with the valve seat 23 as shown in FIG. 4 by the pressing force of the inwardly bent section 34.

The discharge valve of the present invention has a good performance with a decreased number of parts smoothly cooperating with a minized noise.

What is claimed is:

1. A discharge valve for a compressor comprising a valve plate having a recessed portion which includes a discharge port with a valve seat lower than the top surface of the valve plate, said recessed portion having a channel of which a bottom surface is raised from that of the recessed portion to be coplanar with the valve seat, a valve reed of a flat, planar strip including a base portion to be received in the channel and a circular portion extending from the base portion for engaging with the valve seat, and a valve spring mounted over the valve reed to retain the valve reed in place, said valve spring having an inwardly bent section for pressing the valve reed against the raised bottom surface of the channel and an outwardly bowed section with a bent tip, which is resiliently deformable for adapting to the opening movement of the valve reed, said recessed portion having a trap with a shoulder at each side end which captures the opposite end of the valve spring to retain the valve spring.

* * * * *